United States Patent [19]
Takasu

[11] 3,881,363
[45] May 6, 1975

[54] SPEED REDUCTION MECHANISM

[75] Inventor: Isamu Takasu, Tokyo, Japan

[73] Assignee: Toyo Glass Machinery Co., Ltd., Tokyo, Japan

[22] Filed: Jan. 30, 1974

[21] Appl. No.: 437,785

Related U.S. Application Data

[63] Continuation of Ser. No. 416,014, Nov. 15, 1973, abandoned.

[30] Foreign Application Priority Data

Nov. 18, 1972 Japan.............................. 47-115242

[52] U.S. Cl........................................ 74/63; 74/116
[51] Int. Cl............................................ F16h 21/12
[58] Field of Search.......................... 74/116, 63, 122

[56] References Cited
UNITED STATES PATENTS

| | | | |
|---|---|---|---|
| 2,134,603 | 10/1938 | Crosman............................... | 74/122 |
| 2,704,459 | 3/1955 | Nanni..................................... | 74/63 |

*Primary Examiner*—Wesley S. Ratliff, Jr.
*Attorney, Agent, or Firm*—Robert E. Burns; Emmanuel J. Lobato; Bruce L. Adams

[57] ABSTRACT

A speed reducer effecting speed reduction without gears and having an eccentric with a disc mounted freely for rotation on the eccentric. The disc has a plurality of elongated driving lugs or studs arranged in a circle and extending generally in a common direction parallel to the axis of rotation of the speed reducer. A driven output member constructed as an output collar on an output boss receiving an output shaft is rotatable about the axis of rotation and it has a plurality of elongated driven lugs or studs arranged in another circle circumferentially of the first-mentioned circle. The driven lugs or studs are greater in number than the driving lugs. As the input rotation is applied to the speed reducer the disc has imparted thereto an eccentric circular motion but it is constrained from rotating about the eccentric or axis of rotation. As it makes its circular motion the driving lugs thereof periodically and successively make tangential contact with adjacent driven lugs and impart rotation thereto in a corresponding direction of rotation so that the driven output shaft rotates at a lesser speed of rotation than the input speed of rotation.

10 Claims, 4 Drawing Figures

SPEED REDUCTION MECHANISM

BACKGROUND OF THE INVENTION

The present invention relates to speed reduction mechanism and more particularly to a new and improved speed reducer that uses no gears in its power transmission system.

Speed reducers of various types are known. Generally the known speed reduction mechanisms have gear systems therein that are difficult to construct, they require making of the gears, and accordingly are relatively expensive and complex.

SUMMARY OF THE INVENTION

It is a primary object of the invention to provide a speed reduction mechanism of a type in which no gears are used in transmission of power from the input to the output.

Another object is to provide a speed reduction mechanism which is compact and inexpensive to manufacture in view of the absence of gears therein.

Another object is to provide a speed reducer capable of functioning with a low power input and with a low noise level.

Still another object of the present invention is to provide a speed reduction mechanism which can smoothly transmit power from a driving or input member to an output or driven member and which operates with extremely low power loss and noise.

A speed reducer according to the invention comprises a driven output boss having a collar mounting a plurality of driven lugs arranged in a first circle angularly spaced from each other and extending in a common direction parallel to the axis of rotation. Driving means have driving eccentric means eccentric to its center and whose center is displaced from the axis of rotation of the driven output boss and output shaft received therein. A disc is mounted for circular movement on the eccentric means without rotation about the axis of rotation of the speed reducer. The disc has a second plurality of driving lugs disposed in a second circle of lesser diameter than the first circle, internally thereof, and extending in a common direction. The second plurality of lugs are less in number than the first plurality of lugs. This second plurality of lugs has lugs disposed for successive ones of the lugs thereof engaging periodically, during eccentric movement of the disc, adjacent lugs of the first plurality of lugs for imparting thereto movement in a corresponding direction. The driven or output shaft is accordingly driven rotationally at a speed substantially less than the speed of rotation of an input applied to the driven boss.

BRIEF DESCRIPTION OF THE DRAWINGS

Other features and advantages of the speed reduction mechanism according to the invention will be apparent from the disclosure and appended claims and drawings in which:

DESCRIPTION OF THE PREFERRED EMBODIMENT

Figure 1B:
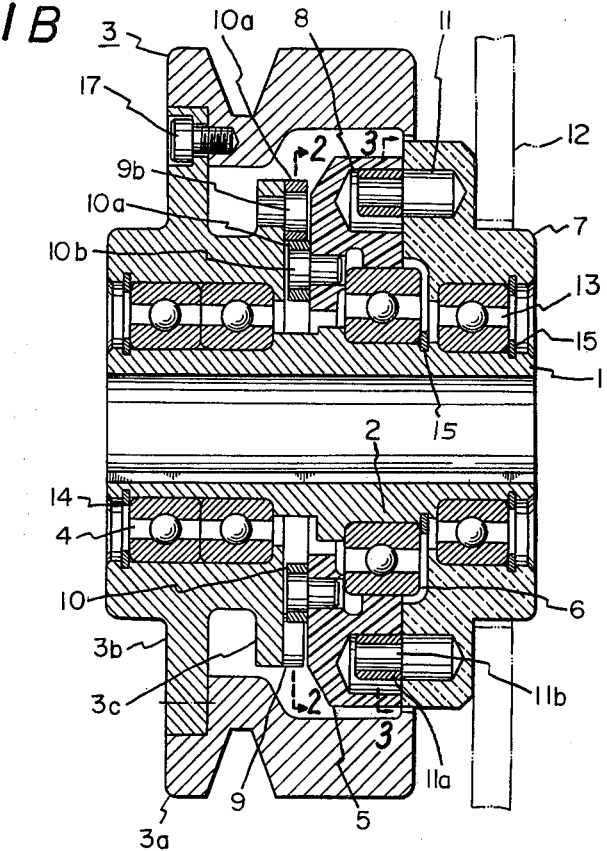
FIG. 1B is a longitudinal section view of a speed reduction mechanism according to the invention.
Figure 1A:
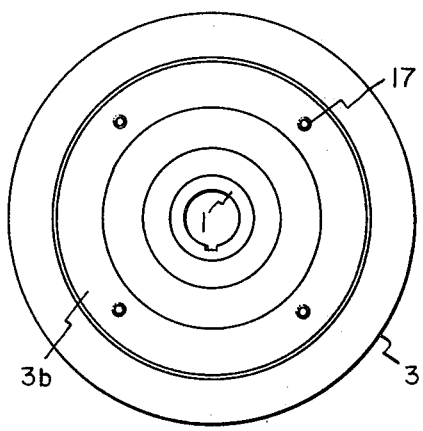
FIG. 1A is a front elevation view of the mechanism in FIG. 1B.

The speed reducer or speed reduction mechanism according to the invention illustrated in the drawings comprises a bushing or boss 1 which receives therein a driven output shaft, not shown. The boss 1 has an integral flange portion or collar 2 driven as later described. The input drive to be reduced in speed is applied through a main or input drive 3 driven directly or indirectly by a suitable prime mover, not shown.

Figure 2:
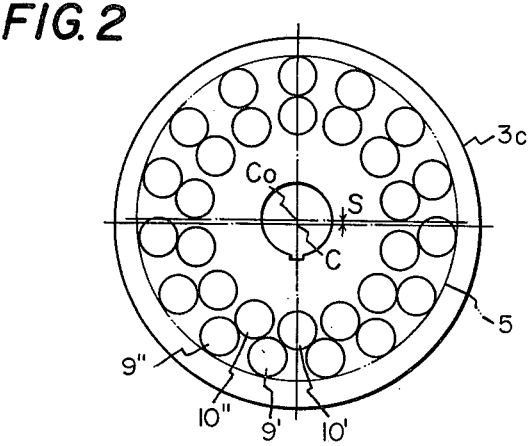
FIG. 2 is a diagrammatic view taken along section line 2—2 of FIG. 1B.
Figure 3:
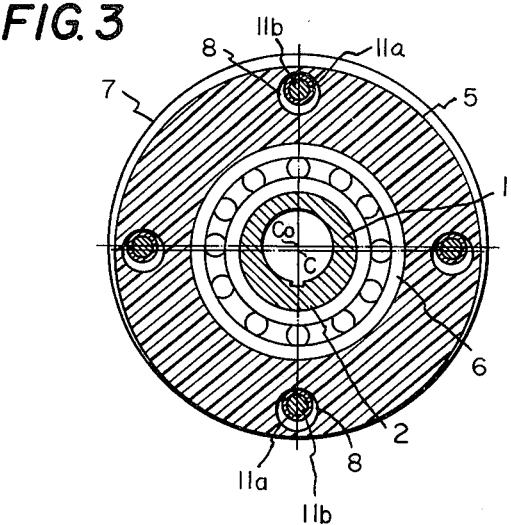
FIG. 3 is a section view taken along section line 3—3 of FIG. 1B.

The input drive comprises a pulley portion 3a, a driving disc 3b secured to the pulley portion 3a and an eccentric 3c integral with the driving disc 3b. The main drive 3 is mounted rotatably on the boss 1 by a bearing 4. The eccentric 3c has a center C which is displaced a distance S from that of the axis of rotation of the apparatus and the driven shaft as shown in FIG. 2. An intermediate disc 5 is mounted by a bearing 6 rotatable on the eccentric 3c.

A stationary disc 7 supports the boss 1 carrying the output shaft and supports the entire mechanism. The stationary disc 7 is provided with a plurality of guides for guiding and restraining the movement of the intermediate disc 5 in conjunction with guide openings 8 thereon as later explained. A plurality of elongated driving lugs or studs 9 are mounted on a face of the intermediate disc 5 extending in a common direction parallel to the axis of rotation of the reducer. The driving lugs each comprise a roller 9a rotatable on a pin portion 9b and are disposed equally spaced in a circle having its center corresponding with the center C of the eccentric 3c.

A plurality of driven elongated lugs or studs 10 are provided for driving thereof by the driving lugs 9. The driven lugs 10 are mounted on a face of disc 5 for driving the collar 2 on the boss 1. Both sets of lugs extend in a common direction, parallel to the axis of rotation of the driven shaft or of the apparatus. The driven lugs 10 are constructed as rollers 10a mounted rotatably on pins portions 10b and are mounted equally spaced on a circle about the axis of rotation circumferentially of the inner circle in which the driving lugs are disposed. The number of driven lugs 10 provided should be larger than the number of driving lugs 9. In practice a suitable number is selected depending on the desired speed reduction ratio. In the embodiment illustrated there are 15 driven lugs 10 compared with fourteen driving lugs as a result of this speed reduction ratio of 15:1 is obtained.

The stationary disc 7 is provided with a plurality of restraining and guide lugs 11 fitting loosely in corresponding guide holes or guide openings 8 provided on a face of the intermediate disc 5 disposed opposed to these restraining lugs 11. These restraining and guide lugs 11 are each constructed as a roller 11a rotatable on a securing pin portion 11b. These rollers have play within the openings 8 to allow the aforementioned circular movement of the intermediate disc within a range afforded by the clearance between the individual openings and their corresponding lugs 11a. This clearance is somewhat smaller than the diameter of each lug 9 or 10 mounted on or opposite the intermediate disc 5, as is best shown in FIG. 1B. As mentioned heretofore the stationary disc 7 mounts the restraining and guide lugs 11 and is itself fixed to a frame member 12 rigid on the base of a prime mover, not shown, and mounts a bearing 13 rotatably supporting the boss 1, the driven shaft, not shown, and the entire mechanism.

A plurality of retainer rings 14, 15 retain respectively the bearings 4 and 13 in position. The stationary disc member 7 is secured through screw holes 16 to the frame member 12 and the driving disc portion 3b is secured to the pulley portion 3a by screws or bolts 17.

The driving input pulley 3, is driven directly or indirectly by means of a prime mover, not shown. Accordingly, the driving eccentric 3c is rotated at the speed of the input mover. As eccentric 3c rotates the intermediate disc member 5 is moved in a motion which can be thought of as "circular" and is restricted from rotation about the axis of rotation because of the aforementioned arrangement of the restraining lugs 11 and associated guide holes 8. The disc 5 does not rotate but is permitted to move in a closed path within the range afforded by the clearance of the restraining lugs 11 in the guide holes 8.

The movement of the intermediate disc 5 causes the lugs thereon to move such that they will successively be brought into operative engagement with the lugs disposed circumferentially thereof. Accordingly, the driven collar 2 and hence the boss 1 and driven output shaft are rotatably driven. As indicated heretofore by suitably selecting the number of lugs in each circle the driven output shaft can be rotated at the desired speed with respect to that of the driving pulley 3. As indicated heretofore the relative speeds or rotational speed ratio of the driven shaft boss 1 and the pulley 3 is 15:1.

A better understanding of the manner in which the driving lugs drive the driven lugs can be had from the diagrammatical illustration in FIG. 2. In the illustration in FIG. 2 the driving lugs 9 are being moved in a clockwise direction and are at their lowermost position and that of the "circular" motion of the intermediate disc 5 and a driving lug 9' is tangentially in contact with two successive driven lugs 10. The contact is tangential to impart motion in a clockwise direction to a driven lug 10'. It can be seen that an adjacent driving lug 9" and others are in contact with two successive driven lugs and impart some rotary motion to a driven lug 10" and other driven lugs in a clockwise direction. In this manner the individual driving lugs are successively brought into operative engagement with two corresponding adjacent driven lugs 10 and drive the driven lugs in a clockwise direction. As a result of this the boss 1 is driven and hence the driven shaft is made to rotate at reduced speed.

The tangential contact is possible since the driving and driven lugs are disposed on circles with different centers and on different radii since there are a different number of studs in each circle. Moreover, the radii of the studs on the two circles are offset as it were. Because of the rotation of the eccentric and because of the sufficiency of the radii offset and the overall eccentricity from the axis of rotation of the apparatus the individual driving lugs will be "inserted" individually between two adjacent driven lugs into tangential contact with a driven lug to which the clockwise closed path movement, of the driving disc and driving lugs, is imparted. This takes place in sequential, tangential contacts and the desired drive at a reduced speed takes place.

The ratio of speed reduction is the quotient obtained by dividing the difference between the number of the driven lugs and that of the driving lugs by the number of the driven lugs. Accordingly, in the instant embodiment the ratio of speed reduction is 1/15.

Those skilled in the art will understand that the apparatus can be constructed from suitable materials. The various rollers can be made of a suitable bearing steel and the apparatus will still be relatively quiet or silent in operation.

What I claim and desire to secure by Letters Patent:
1. A speed changer comprising:
 a driving element disposed for rotation at a first speed;
 a disc; means for locking the disc against rotation and for mounting it for movement in a closed circular path;
 a driven element disposed for rotation;
 motion transforming means between one of said elements and said disc, comprising a number of first lugs mounted on one of said elements to define a first circle, the lugs being equally circumferentially spaced apart along said circle, a different number of second lugs mounted on said disc to define a second circle concentric with the first circle, the second lugs being equally circumferentially spaced apart along said second circle, the lugs of one circle being disposed individually — sequentially to bear upon the lugs of the other circle in approximately tangential directions; and
 means for drivingly connecting said disc with the element other than said one element;
 to effect quiet rotation of the driven element at a speed different from said first speed and defined by the different numbers of lugs in the first and second circles.
2. A speed changer according to claim 1 wherein the driving element comprises a pulley.
3. A speed changer according to claim 1 wherein one of said elements comprises a disc having one of said circles of lugs mounted thereon.
4. A speed changer according to claim 1 wherein the driving element surrounds the disc and the driven element.
5. A speed changer according to claim 1 including ball-bearings; the disc being mounted on said ball-bearings.
6. A speed changer according to claim 5 including additional ball-bearings, the driven element being mounted thereon.
7. A speed changer according to claim 1 wherein said closed circular path is considerably smaller than said disc.
8. A speed changer according to claim 1 wherein a set of said lugs, not mounted on said disc, is mounted on said driving element.
9. A speed changer according to claim 1 wherein said driving and driven elements are coaxial and said disc is approximately coaxial therewith.
10. A speed changer according to claim 1 wherein said means for locking the disc against rotation and for mounting it for movement in a circular path comprises a stationary disc; one of said discs having additional lugs, circumferentially spaced apart, and the other disc having guide holes, one for each additional lug, receiving said additional lugs and affording limited clearance for movement thereof, in the guide holes, in a closed circular path.

* * * * *